United States Patent
Saito et al.

(10) Patent No.: US 12,415,469 B2
(45) Date of Patent: Sep. 16, 2025

(54) ELECTRICAL WIRE WITH PATH RESTRICTING MEMBER ATTACHED AND WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP); Masashi Fujiki, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 232 days.

(21) Appl. No.: 18/031,410

(22) PCT Filed: Oct. 19, 2021

(86) PCT No.: PCT/JP2021/038645
§ 371 (c)(1),
(2) Date: Apr. 12, 2023

(87) PCT Pub. No.: WO2022/085692
PCT Pub. Date: Apr. 28, 2022

(65) Prior Publication Data
US 2023/0406239 A1    Dec. 21, 2023

(30) Foreign Application Priority Data
Oct. 23, 2020    (JP) .................. 2020-178421

(51) Int. Cl.
*B60R 16/02*    (2006.01)
*H02G 3/04*    (2006.01)

(52) U.S. Cl.
CPC .......... *B60R 16/0215* (2013.01); *H02G 3/04* (2013.01)

(58) Field of Classification Search
CPC .. H02G 3/04; H02G 3/30; H02G 3/32; H02G 3/40; H02G 3/0418; H02G 3/0462;
(Continued)

(56) References Cited

U.S. PATENT DOCUMENTS 2,408,253 A * 9/1946 Diebold ............... H02G 7/00
174/136
4,119,285 A * 10/1978 Bisping .................. F16L 3/13
248/222.12
(Continued)

FOREIGN PATENT DOCUMENTS

JP    2011-120404 A    6/2011
JP    2017-147170 A    8/2017

OTHER PUBLICATIONS

Dec. 14, 2021 International Search Report issued in International Patent Application No. PCT/JP2021/038645.

*Primary Examiner* — Paresh Paghadal
(74) *Attorney, Agent, or Firm* — Oliff PLC

(57) ABSTRACT

An electrical wire structure including: an electrical wire; an exterior tube covering an outer periphery of the electrical wire; and a path restrictor covering a range spanning more than half of an outer periphery of the exterior tube in a circumferential direction of the exterior tube, extending along a lengthwise direction of the exterior tube, and restricting a path along which the electrical wire is routed.

12 Claims, 4 Drawing Sheets

(58) Field of Classification Search
CPC .............. H02G 3/0481; B60R 16/0207; B60R 16/0215; H01B 7/0045
USPC ................................ 248/68.1, 73, 74.1–74.4
See application file for complete search history.

(56) References Cited

U.S. PATENT DOCUMENTS

| | | | | |
|---|---|---|---|---|
| 4,226,164 | A * | 10/1980 | Carter | F16L 19/0231 |
| | | | | 285/39 |
| 4,306,697 | A * | 12/1981 | Mathews | F16L 3/222 |
| | | | | 248/68.1 |
| 4,786,088 | A * | 11/1988 | Ziu | F16L 9/18 |
| | | | | 285/133.11 |
| 5,018,260 | A * | 5/1991 | Ziu | F16L 9/18 |
| | | | | 138/108 |
| 7,422,181 | B2 * | 9/2008 | Su | B60T 17/046 |
| | | | | 174/664 |
| 7,456,361 | B2 * | 11/2008 | Hill | H01R 4/646 |
| | | | | 248/74.2 |
| 9,062,804 | B2 * | 6/2015 | Wang | F16L 15/06 |
| 9,816,540 | B2 * | 11/2017 | Smullen | D06F 55/00 |
| 2014/0027584 | A1 * | 1/2014 | Pauchet | F16L 3/123 |
| | | | | 248/68.1 |
| 2014/0196929 | A1 | 7/2014 | Okuhara | |
| 2016/0325699 | A1 | 11/2016 | Yoshida et al. | |
| 2019/0351846 | A1 | 11/2019 | Matsuyama et al. | |
| 2022/0189655 | A1 | 6/2022 | Kitahara | |

* cited by examiner

ELECTRICAL WIRE WITH PATH RESTRICTING MEMBER ATTACHED AND WIRE HARNESS

BACKGROUND

The present disclosure relates to an electrical wire with path restricting member attached and a wire harness.

Conventionally, electrical wires with path restricting member attached that include a corrugated tube covering the outer periphery of an electrical wire member and a path restricting member covering part of the corrugated tube in the circumferential direction thereof and restricting the path along which the wire member is routed are known (e.g., see JP 2013-55760A).

The corrugated tube of the electrical wire with path restricting member attached described in JP 2013-55760A has a lengthwise slit formed therein. The path restricting member includes a path maintaining member provided around the outer periphery of the corrugated tube and an attachment member provided within the slit. The attachment member is configured to be latchable onto both a portion on the inner peripheral side of the slit and a portion on the outer peripheral side of the path maintaining member. The path of the wire member is restricted due to the corrugated tube, the path maintaining member and the attachment member being fixed by taping or the like.

A configuration is conceivable in which the wire harness is fixed to a vehicle body, due to the integrated corrugated tube and path restricting member being collectively bound together and held with a belt clamp, and the belt clamp being fixed to the vehicle body, for example.

SUMMARY

Incidentally, since a path restricting member such as described above had a constant thickness, there is a problem that flexural rigidity is low. The flexural rigidity of the path restricting member being low is a factor leading to the wire member deviating from its path.

An exemplary aspect of the disclosure provides an electrical wire with path restricting member attached and a wire harness that are capable of suppressing deviation of an electrical wire member from its path.

An electrical wire with path restricting member attached of the present disclosure includes an electrical wire; an exterior tube covering an outer periphery of the electrical wire; and a path restrictor covering a range spanning more than half of an outer periphery of the exterior tube in a circumferential direction of the exterior tube, extending along a lengthwise direction of the exterior tube, and restricting a path along which the electrical wire is routed, wherein the path restrictor has: a main body covering a range spanning more than half of the outer periphery of the exterior tube in the circumferential direction of the exterior tube; an insertion opening formed by both circumferential ends of the main body, extending along a lengthwise direction of the path restrictor over an entirety thereof in the lengthwise direction, and configured for the exterior tube to be insertable therein; and a rib protruding from an outer periphery of the main body and extending along the lengthwise direction of the path restrictor.

A wire harness of the present disclosure includes an electrical wire with a path restrictor attached; and a fixing member holding the electrical wire with the path restrictor attached, wherein the electrical wire with the path restrictor attached has: the electrical wire; an exterior tube covering an outer periphery of the electrical wire; and the path restrictor covering a range spanning more than half of an outer periphery of the exterior tube in a circumferential direction of the exterior tube, extending along a lengthwise direction of the exterior tube, and restricting a path along which the electrical wire is routed, the path restrictor has: a main body covering a range spanning more than half of the outer periphery of the exterior tube in the circumferential direction of the exterior tube; an insertion opening formed by both circumferential ends of the main body, extending along a lengthwise direction of the path restrictor over an entirety thereof in the lengthwise direction, and configured for the exterior tube to be insertable therein; and a rib protruding from an outer periphery of the main body and extending along the lengthwise direction of the path restrictor, the main body has: a first constituent part forming one side of the main body with respect to a circumferential center of the main body; and a second constituent part forming the other side of the main body with respect to the circumferential center of the main body, the rib includes support ribs provided on both the first constituent part and the second constituent part, and the fixing member has a pair of supporting parts supporting the support ribs.

According to an electrical wire with path restricting member attached and a wire harness of the present disclosure, deviation of an electrical wire member from its path can be suppressed.

DETAILED DESCRIPTION OF EMBODIMENTS

Description of Embodiments of Disclosure

Figure 1:
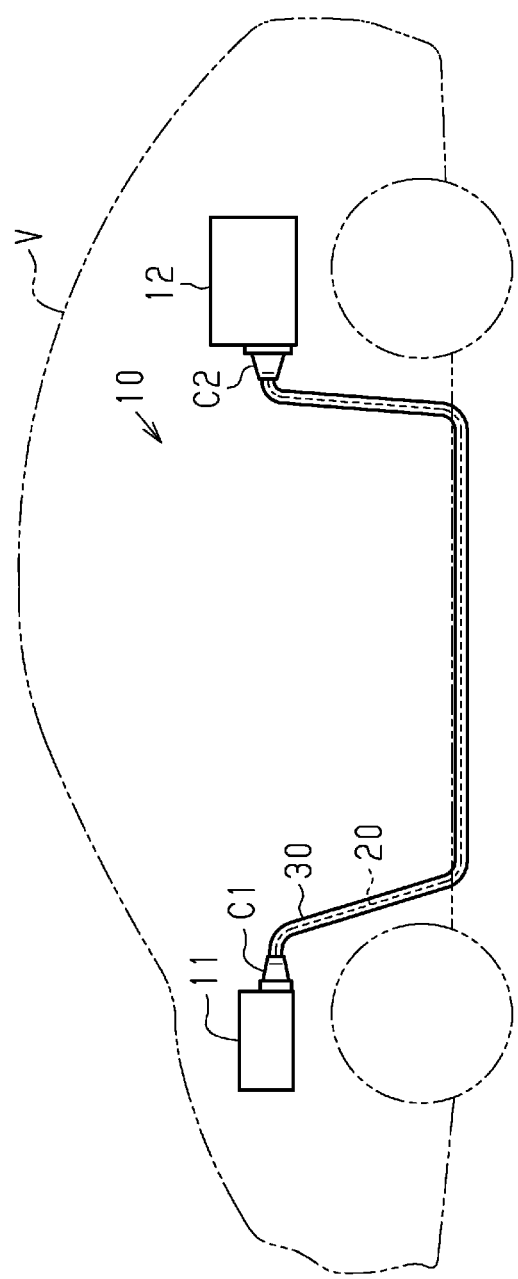
FIG. 1 is a schematic configuration diagram showing a wire harness of one embodiment.

Initially, modes of the present disclosure will be enumerated and described.

An electrical wire with path restricting member attached of the present disclosure includes:

[1] an electrical wire member, a tubular exterior member coveting an outer periphery of the wire member, and a path restricting member covering a range spanning more than half of an outer periphery of the exterior member in a circumferential direction of the exterior member, extending along a lengthwise direction of the exterior member, and restricting a path along which the wire member is routed, the path restricting member having a main body part covering a range spanning more than half of the outer periphery of the exterior member in the circumferential direction of the exterior member, an insertion opening formed by both circumferential end portions of the main body part, extending along a lengthwise direction of the path restricting member over an entirety thereof in the lengthwise direction, and configured for the exterior member to be insertable therein, and a rib protruding from an outer periphery of the main body part and extending along the lengthwise direction of the path restricting member.

According to this configuration, the path restricting member can be subsequently attached to the outer periphery of the exterior member through the insertion opening. Further, since the path restricting member has the rib that protrudes from the outer periphery of the main body part and extends along the lengthwise direction of the path restricting member, the flexural rigidity of the path restricting member can be increased. Therefore, deviation of the wire member from its path can be suppressed.

[2] Preferably, the path restricting member is more rigid than the exterior member.

According to this configuration, the path of the wire member can be more firmly restricted by the rigid path restricting member.

[3] Preferably, the main body part has a first constituent part constituting one side of the main body part with respect to the circumferential center thereof, and a second constituent part constituting the other side of the main body part with respect to the circumferential center thereof, and the rib includes support ribs provided on both the first constituent part and the second constituent part.

According to this configuration, since the rib includes the support ribs that are provided on both the first constituent part and second constituent part of the main body part, the electrical wire with path restricting member attached is easily supported by another member. That is, since the support ribs are provided on the first constituent part constituting one side of the main body part with respect to the circumferential center thereof and the second constituent part constituting the other side of the main body part with respect to the circumferential center thereof, the electrical wire with path restricting member attached is easily held by the fixing part supporting the pair of support ribs.

[4] Preferably, the rib includes guiding ribs provided on both circumferential end portions of the main body part, and spaced wider apart from each other proceeding in a direction in Which the ribs protrude.

According to this configuration, since the rib includes the guiding ribs that are provided on both circumferential end portions of the main body part and are spaced wider apart from each other proceeding in the direction in which the ribs protrude, the exterior member can be smoothly inserted inside the path restricting member.

A wire harness of the present disclosure includes:

[5] an electrical wire with path restricting member attached and a fixing member holding the electrical wire with path restricting member attached, the electrical wire with path restricting member attached having an electrical wire member, a tubular exterior member covering an outer periphery of the wire member, and a path restricting member covering a range spanning more than half of an outer periphery of the exterior member in a circumferential direction of the exterior member, extending along a lengthwise direction of the exterior member, and restricting a path along which the wire member is routed, the path restricting member having a main body part covering a range spanning more than half of the outer periphery of the exterior member in the circumferential direction of the exterior member, an insertion opening formed by both circumferential end portions of the main body part, extending along a lengthwise direction of the path restricting member over an entirety thereof in the lengthwise direction, and configured for the exterior member to be insertable therein, and a rib protruding from an outer periphery of the main body part and extending along the lengthwise direction of the path restricting member, the main body part having a first constituent part constituting one side of the main body part with respect to the circumferential center thereof, and a second constituent part constituting the other side of the main body part with respect to the circumferential center thereof, the rib including support ribs provided on both the first constituent part and the second constituent part, and the fixing member having a pair of supporting parts supporting the support ribs.

According to this configuration, the path restricting member can be subsequently attached to the outer periphery of the exterior member through the insertion opening. Further, since the path restricting member has the rib that protrudes from the outer periphery of the main body part and extends along the lengthwise direction of the path restricting member, the flexural rigidity of the path restricting member can be increased. Therefore, deviation of the wire member from its path can be suppressed. Also, since the rib includes the support ribs that are provided on both the first constituent part and the second constituent part of the main body part, the electrical wire with path restricting member attached is easily supported by another member. That is, since the support ribs are provided on the first constituent part constituting one side of the main body part with respect to the circumferential center thereof and the second constituent part constituting the other side of the main body part with respect to the circumferential center thereof, the electrical wire with path restricting member attached is easily held by the fixing part supporting the pair of support ribs. Further, the fixing member is easily able to hold the electrical wire with path restricting member attached due to supporting the pair of support ribs with the pair of supporting parts.

[6] Preferably, the path restricting member is more rigid than the exterior member.

According to this configuration, the path of the wire member can be more firmly restricted by the rigid path restricting member.

[7] Preferably, the fixing member has an engaging part protruding toward the insertion opening, and the engaging part is contactable with at least one of the circumferential end portions of the main body part, According to this configuration, since the engaging part of the fixing member is contactable with at least one of the two circumferential end portions of the main body part, the fixing member is able to suppress circumferential rotation of the path restricting member with respect to the fixing member while holding the path restricting member.

[8] Preferably, the engaging part has a narrow portion narrowing in width proceeding toward a distal end side as seen from the lengthwise direction of the path restricting member.

According to this configuration, since the engaging part has the narrow portion that narrows in width proceeding toward the distal end side as seen from the lengthwise direction of the path restricting member, the engaging part is easily inserted into the insertion opening, and assembly is facilitated.

[9] Preferably, the rib includes guiding ribs provided on both circumferential end portions of the main body part, and spaced wider apart from each other proceeding in a direction in which the ribs protrude.

According to this configuration, since the rib includes the guiding ribs that are provided on both circumferential end portions of the main body part and are spaced wider apart from each other proceeding in the direction in which the ribs protrude, the exterior member can be smoothly inserted inside the path restricting member.

[10] Preferably, the rib includes guiding ribs provided on both circumferential end portions of the main body part, and spaced wider apart from each other proceeding in a direction in which the ribs protrude, and the engaging part is contactable with at least one of the guiding ribs.

According to this configuration, since the rib includes the guiding ribs that are provided on both circumferential end portions of the main body part and are spaced wider apart from each other proceeding in the direction in which the ribs protrude, the exterior member can be smoothly inserted inside the path restricting member. Also, since the engaging part is contactable with at least one of the guiding ribs, circumferential rotation of the path restricting member with respect to the fixing member can be further suppressed.

An electrical wire with path restricting member attached of the present disclosure is:

[11] an electrical wire with path restricting member attached configured to be held in a fixing member having a pair of supporting parts, including an electrical wire member, a tubular exterior member covering an outer periphery of the wire member, and a path restricting member covering a range spanning more than half of an outer periphery of the exterior member in a circumferential direction of the exterior member, extending along a lengthwise direction of the exterior member, and restricting a path along which the wire member is routed, the path restricting member having a main body part covering a range spanning more than half of the outer periphery of the exterior member in the circumferential direction of the exterior member, an insertion opening formed by both circumferential al end portions of the main body part, extending along a lengthwise direction of the path restricting member over an entirety thereof in the lengthwise direction, and configured for the exterior member to be insertable therein, and a rib protruding from an outer periphery of the main body part and extending along the lengthwise direction of the path restricting member, the main body part having a first constituent part constituting one side of the main body part with respect to the circumferential center thereof, and a second constituent part constituting the other side of the main body part with respect to the circumferential center thereof, and the rib including support ribs provided on both the first constituent part and the second constituent part, and supported by the pair of supporting parts.

According to this configuration, the path restricting member can be subsequently attached to the outer periphery of the exterior member through the insertion opening. Further, since the path restricting member has the rib that protrudes from the outer periphery of the main body part and extends along the lengthwise direction of the path restricting member, the flexural rigidity of the path restricting member can be increased. Therefore, deviation of the wire member from its path can be suppressed. Moreover, since the rib includes the support ribs that are provided on both the first constituent part and the second constituent part of the main body part and are supported by the pair of supporting parts of the fixing member, the electrical wire with path restricting member attached is easily supported. That is, since the support ribs are provided on the first constituent part constituting one side of the main body part with respect to the circumferential center thereof and the second constituent part constituting the other side of the main body part with respect to the circumferential center thereof, the electrical wire with path restricting member attached is easily held by the pair of supporting parts supporting the support ribs.

Preferably, the path restricting member is more rigid than the exterior member.

According to this configuration, the path of the wire member can be more firmly restricted by the rigid path restricting member.

Detailed Description of Embodiments of Disclosure

Specific examples of a wire harness of the present disclosure will be described below with reference to the drawings. In the individual diagrams, part of the configuration may be shown in an exaggerated manner or a simplified manner, for convenience of description. Also, the dimensional ratios of various portions may differ in the individual diagrams. Note that the present disclosure is not limited to these illustrative examples and is defined by the claims, and all changes that come within the meaning and range of equivalency of the claims are intended to be embraced therein. Herein, "orthogonal" is not only strictly orthogonal but also includes generally orthogonal within a range that achieves the operation and effect of the present embodiment. Also, herein, "circular" and "circular arc shaped" are not only strictly circular and circular arc shaped but also include generally circular and circular arc shaped within a range that achieves the operation and effect of the present embodiment.

Overall Configuration of Wire Harness 10

A wire harness 10 shown in FIG. 1 electrically connects two electrical devices or three or more electrical devices. The wire harness 10 electrically connects an inverter 11 installed in a front part of a vehicle V such as a hybrid vehicle or an electric vehicle, and a high voltage battery 12 installed in the vehicle V rearward of the inverter 11. The wire harness 10 is, for example, routed so as to pass under the floor of the vehicle V. For example, an intermediate portion of the wire harness 10 in the lengthwise direction thereof is routed so as to pass outside the vehicle cabin such as under the floor of the vehicle V.

The inverter 11 is connected to a motor for driving wheels (not shown) that serves as a power source for vehicle travel. The inverter 11 generates AC power from the DC power of the high voltage battery 12 and supplies the AC power to the motor. The high voltage battery 12 is, for example, a battery capable of supplying a voltage of several hundred volts.

Figure 2:
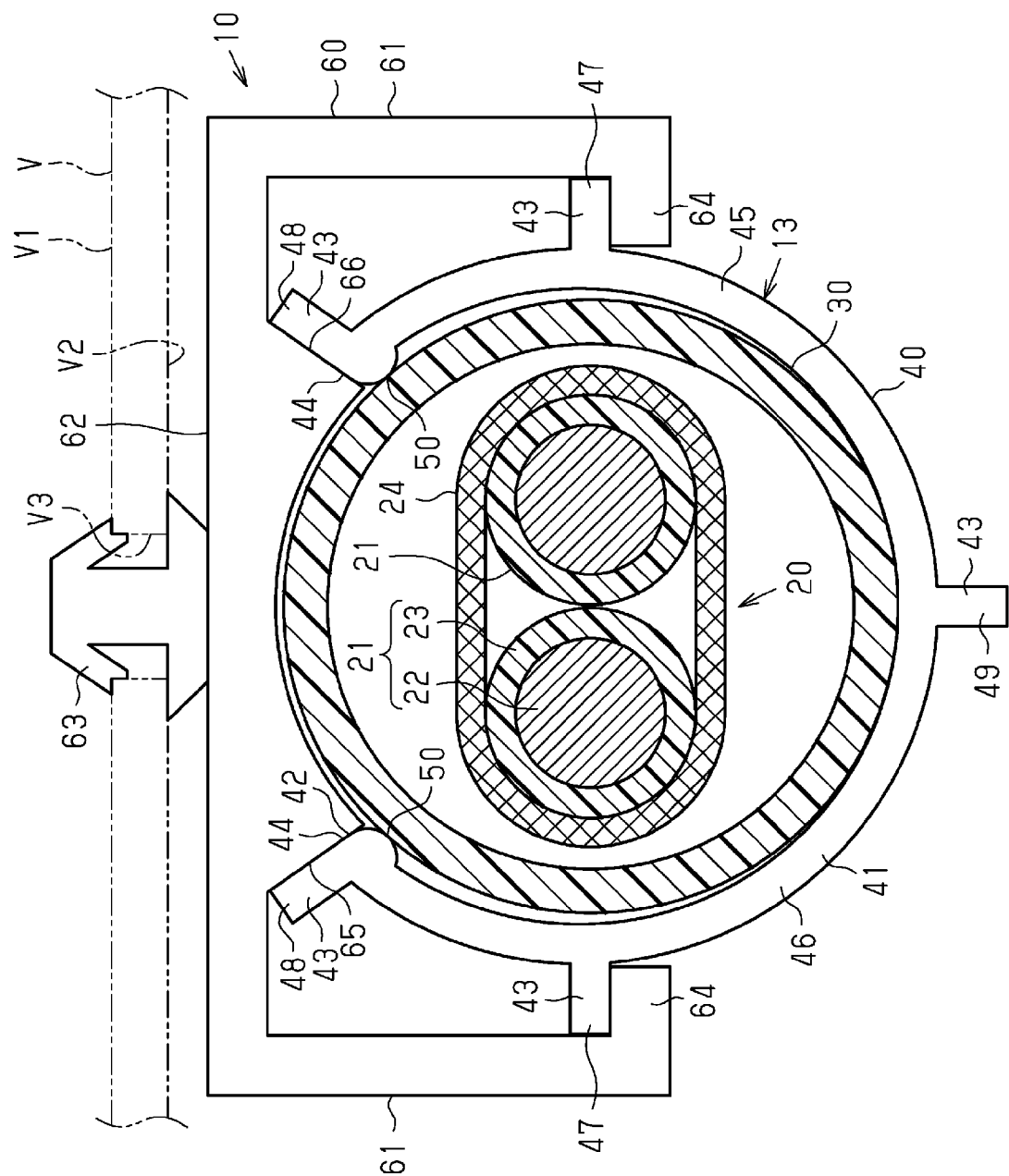
FIG. 2 is a cross-sectional view showing part of the wire harness of one embodiment.

As shown in FIG. 2, the wire harness 10 includes an electrical wire 13 with path restricting member attached. The electrical wire 13 with path restricting member attached includes a wire member 20 (electrical wire) that electrically connects the electrical devices to each other, a tubular exterior member 30 (exterior tube) that covers the outer periphery of the wire member 20, and a path restricting member 40 (path restrictor) that covers the outer periphery of the exterior member 30 and restricts the path (hereinafter, routing path) along which the wire member 20 is routed.

Figure 4:
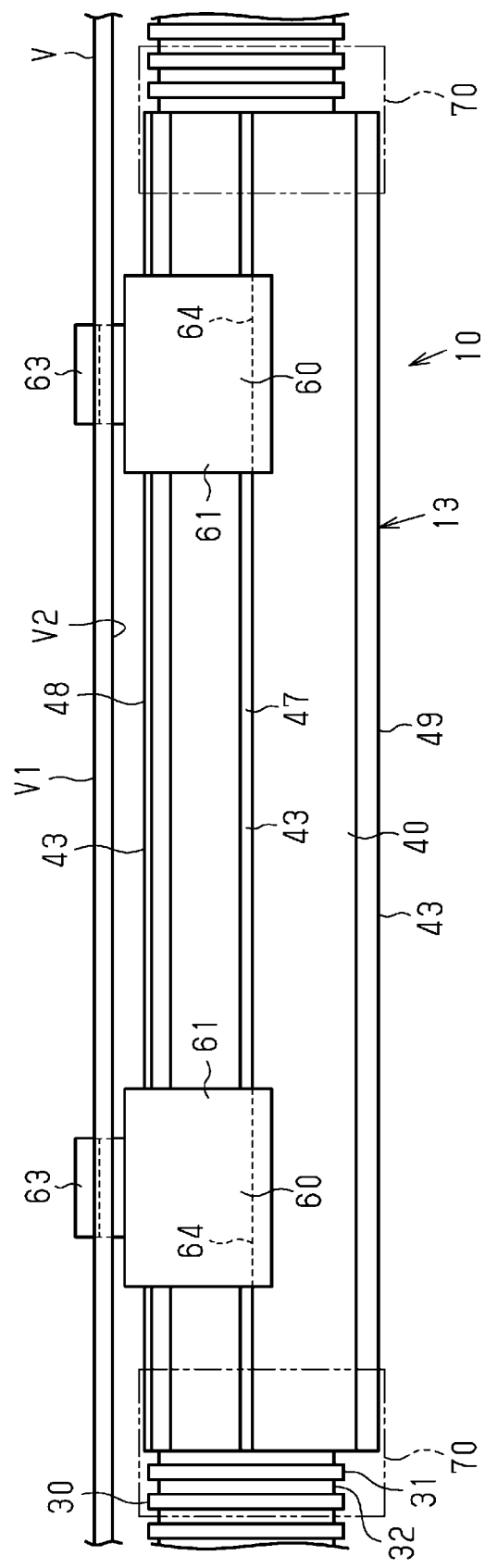
FIG. 4 is a side view in which the wire harness of one embodiment is fixed to a vehicle body.

Also, as shown in FIGS. 2 and 4, the wire harness 10 includes a fixing member 60 that holds the path restricting member 40 and is fixed to a vehicle body V1 of the vehicle V. A pair of connectors C1 and C2 are respectively attached to either end portion of the wire member 20.

Configuration of Wire Member 20

The wire member 20 includes one or more electrical wires 21 and a braided member 24 that collectively covers the outer periphery of the one or more wires 21, The wire member of the present embodiment has two wires 21. One end portion of the wire member 20 is connected to the inverter 11 via the connector C1, and the other end portion of the wire member 20 is connected to the high voltage battery 12 via the connector C2. The wire member 20 is formed in an elongated shape so as to extend in the front-rear direction of the vehicle, for example. The wires 21 are, for example, high voltage electrical wires capable of handling a high voltage and a large current. The wires 21 may, for example, be unshielded wires that do not have their own electromagnetic shielding structure, or shielded wires that have their own electromagnetic shielding structure.

Configuration of Wire 21

As shown in FIG. 2, the wire 21 is a coated electrical wire that has a core wire 22 composed of a conductor and an insulation coating 23 covering the outer periphery of the core wire 22.

Configuration of Core Wire 22

As the core wire 22, a twisted wire formed by combining a plurality of metal wire strands, a columnar conductor composed of one columnar metal rod having a solid structure internally, or a tubular conductor having a hollow structure internally, for example, can be used. A plurality of types of conductors such as a twisted wire, a columnar conductor and a tubular conductor, for example, can also be used as the core wire 22. Examples of the columnar conductor include a single core wire and a busbar. The core wire 22 of the present embodiment is a twisted wire. As the material of the core wire 22, a copper-based or aluminum-based metal material, for example, can be used.

The cross-sectional shape (hereinafter referred to as the transverse sectional shape) in which the core wire 22 is cut by a plane orthogonal to the lengthwise direction of the core wire 22, that is, orthogonal to the lengthwise direction of the wire 21, can be any shape. The transverse sectional shape of the core wire 22 is formed in a circular shape, a semicircular shape, a polygonal shape, a square shape or an oblate shape, for example. The transverse sectional shape of the core wire 22 of the present embodiment is formed in a circular shape.

Configuration of Insulation Coating 23

The insulation coating 23 covers the outer peripheral surface of the core wire 22 around the entire circumference, for example. The insulation coating 23 is made of an insulating material such as a synthetic resin, for example. As the material of the insulation coating 23, a synthetic resin whose main component is a polyolefin resin such as cross-linked polyethylene or cross-linked polypropylene, for example, can be used. Also, as the material of the insulation coating 23, one type of material may be used alone, or two or more types of materials may be used in combination as appropriate.

Configuration of Braided Member 24

The braided member 24 has a tubular shape that collectively covers the outer periphery of the wires 21 as a whole, for example. The braiding member 24 is provided so as to cover the outer periphery of the wires 21 along approximately the entirety of the wires 21 in the lengthwise direction thereof, for example. As the braided member 24, a braided wire in which a plurality of metal wire strands are braided or a braided wire in which metal wire strands and resin wire strands are braided together can be used. As the material of the metal wire strands, a copper-based or aluminum-based metal material, for example, can be used. Although not shown in the diagrams, the braided member 24 is grounded at the connectors C1 and C2 and the like, for example.

Configuration of Exterior Member 30

Figure 3:
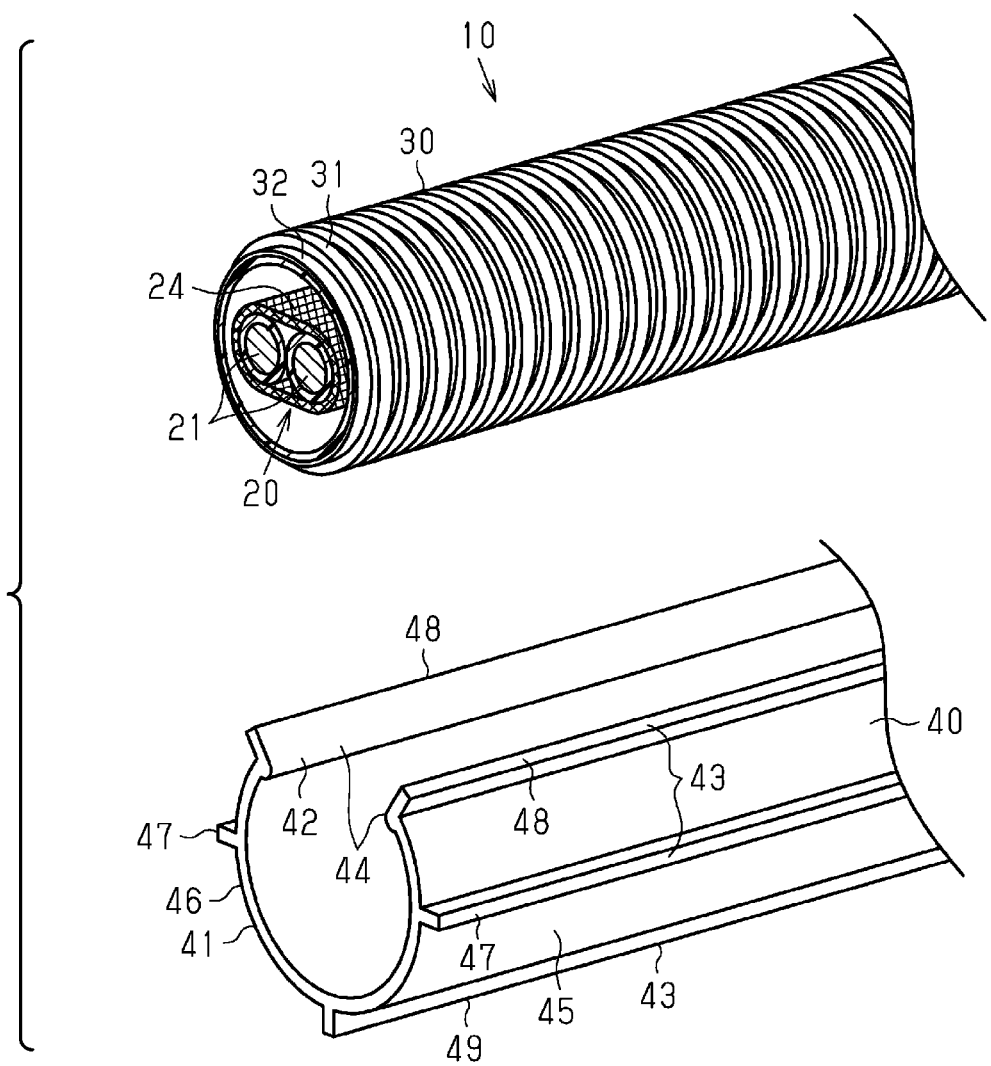
FIG. 3 is a partially exploded perspective view of an electrical wire with path restricting member attached of one embodiment.

As shown in FIGS. 2 and 3, the exterior member 30 has a cylindrical shape that covers the outer periphery of the wire member 20 around its entirety in the circumferential direction. The exterior member 30 is sealed around its entirety in the circumferential direction. The exterior member 30 is provided so as to cover a lengthwise part of the outer periphery of the wire member 20, for example. As shown in FIG. 3, the exterior member 30 of the present embodiment is a corrugated tube having a bellows structure in which an annular raised part 31 and an annular recessed part 32 are alternately provided continuously along the lengthwise direction thereof. The exterior member 30 has flexibility.

As the material of the exterior member 30, a resin material that has conductivity or a resin material that does not have conductivity, for example, can be used. As the resin material, a synthetic resin such as polyolefin, polyimide, polyester or ABS resin, for example, can be used.

Configuration of Path Restricting Member 40

As shown in FIGS. 2 and 4, the path restricting member 40 covers a range spanning more than half of the outer periphery of the exterior member 30 in the circumferential direction of the exterior member 30 and extends along the lengthwise direction of the exterior member 30. The path restricting member 40 of the present embodiment is attached to the outer periphery of a portion of the routing path of the wire member 20 where the exterior member 30 passing under the floor of the vehicle V or the like extends linearly. The path restricting member 40 is more rigid than the exterior member 30. That is, the hardness of the path restricting member 40 is such that the path restricting member 40 does not easily bend in a direction orthogonal to the lengthwise direction of the wire harness 10, as compared with the exterior member 30.

The path restricting member 40 is made of resin. As the material of the path restricting member 40, a synthetic resin such as polypropylene, polyamide or polyacetal, for example, can be used. The path restricting member 40 can be manufactured by a known manufacturing method such as extrusion molding or injection molding, for example. The path restricting member 40 of the present embodiment has a constant cross-sectional shape as seen from the lengthwise direction. The path restricting member 40 is an extrusion molded article. Note that, as described above, the path restricting member 40 is more rigid than the exterior member 30, but the constituent material of the path restricting member 40 need not be a material that is harder as a raw material than the constituent material of the exterior member 30. That is, the constituent material of the path restricting member 40 may be a harder material or a softer material with respect to the constituent material of the exterior member 30. Also, the constituent material of the path restricting member 40 may be the same material as the constituent material of the exterior member 30.

As shown in FIG. 2, the path restricting member 40 has a main body part 41 (main body), an insertion opening 42, and ribs 43. The main body part 41 is formed so as to cover a range spanning more than half of the outer periphery of the exterior member 30 in the circumferential direction of the exterior member 30. The insertion opening 42 is formed by both circumferential end portions 44 of the main body part 41, extends along the lengthwise direction of the path restricting member 40 over the entirety thereof in the lengthwise direction, and is configured for the exterior member 30 to be insertable therein. The ribs 43 protrude from the outer periphery of the main body part 41 and extends along the lengthwise direction of the path restricting member 40.

Specifically, the main body part 41 includes a first constituent part 45 constituting one side of the main body part 41 with respect to the circumferential center thereof and a second constituent part 46 constituting the other side of the main body part 41 with respect to the circumferential center thereof. Further, the ribs 43 include support ribs 47 provided on both the first constituent part 45 and the second constituent part 46. The pair of support ribs 47 protrude in directly opposite directions to each other. Also, the pair of support ribs 47 are set so as to protrude horizontally in a state where the path restricting member 40 is fixed to the vehicle body V1. Note that the insertion opening 42 is set so as to face upward in a state where the path restricting member 40 is fixed to the vehicle body V1.

Also, the ribs 43 include guiding ribs 48 that are provided on both circumferential end portions 44 of the main body part 41, and are spaced wider apart from each other proceeding in the direction in which the ribs 43 protrude.

Also, the ribs 43 include a general rib 49 provided at the circumferential center of the main body part 41, that is, at the boundary between the first constituent part 45 and the second constituent part 46.

The path restricting member 40 has a pair of protruding parts 50 that protrude toward the exterior member 30 inserted therein and contact the outer surface of the exterior member or, more specifically, the outer surface of the annular raised parts 31. The protruding parts protrude from the inner surface of both circumferential end portions 44 of the main body part 41. The transverse sectional shape of the protruding parts 50 is a semicircular shape, for example. The protruding parts 50 extend along the lengthwise direction of the path restricting member 40 over the entirety thereof in the lengthwise direction.

The insertion opening 42 extends over the entirety of the path restricting member 40 in the lengthwise direction thereof. The opening width of the insertion opening 42, that is, the shortest distance between the both circumferential end portions 44 of the main body part 41 is smaller than the outer diameter of the exterior member 30.

When inserting the exterior member 30 into the first insertion opening 42 from a direction orthogonal to the lengthwise direction, the path restricting member 40 is elastically deformed and the opening width of the first insertion opening 42 is enlarged, Once the exterior member 30 is inserted inside the path restricting member 40, the path restricting member 40 elastically returns toward its original shape. Since the opening width thereby becomes smaller than the outer diameter of the exterior member 30, the path restricting member 40 is attached to the exterior member 30.

Configuration of Fixing Member 60

As shown in FIGS. 2 and 4, the fixing member 60 holds the electrical wire 13 with path restricting member attached and is fixed to an attachment surface V2 of the vehicle body V1. The attachment surface V2 of the present embodiment is a surface under the floor of the vehicle V outside the vehicle cabin and opposes the ground. As shown in FIG. 4, a plurality of fixing members 60 are provided in the lengthwise direction of the path restricting member 40. In the present embodiment, two fixing members 60 are provided in the lengthwise direction of the path restricting member 40.

The fixing member 60 is made of resin. The fixing member 60 has a pair of supporting parts 61 that support the support ribs 47 of the path restricting member 40.

Specifically, as shown in FIG. 2, the fixing member 60 includes a plate-like vehicle body opposing part 62 that opposes the attachment surface V2 of the vehicle body V1 and the supporting parts 61 that bend and extend from both widthwise sides of the vehicle body opposing part 62.

The vehicle body opposing part 62 has a fitting part 63 that is fitted into an attachment hole V3 formed on the attachment surface V2. The supporting parts 61 are set such so as to extend downward in a state where the fixing member 60 is fixed to the vehicle body V1. Also, the pair of supporting parts 61 each have a supporting claw 64 that protrudes from the distal end of the supporting parts 61 on the sides facing each other. The supporting parts 61 support the support ribs 47 in a manner whereby the lower surface of the support ribs 47 is placed on the upper surface of the supporting claws 64. In other words, an upper region of the electrical wire 13 with path restricting member attached is disposed between the pair of supporting parts 61, and the electrical wire 13 with path restricting member attached is held in the fixing member 60 by the pair of support ribs 47 being supported on the pair of supporting claws 64.

The fixing member 60 has an engaging part 65 that protrudes toward the insertion opening 42 of the path restricting member 40 that is held. In other words, the fixing member 60 has the engaging part 65 that protrudes so as to be disposed inside the insertion opening 42 of the path restricting member 40 that is held. The engaging part 65 is contactable with both circumferential end portions 44 of the main body part 41 of the path restricting member 40. The engaging part 65 is disposed between both circumferential end portions 44 of the main body part 41 of the path restricting member 40, and, when the path restricting member 40 goes to rotate circumferentially with respect to the fixing member 60, restricts rotation of the path restricting member 40 by contacting the end portions 44.

The engaging part 65 is provided on the vehicle body opposing part 62 of the fixing member 60. Specifically, the engaging part 65 protrudes toward the insertion opening 42 from the vehicle body opposing part 62. In other words, the engaging part 65 protrudes from the attachment surface V2 side of the vehicle body V1. The engaging part 65 protrudes toward the ground. The insertion opening 42 of the path restricting member 40 thereby faces upward, which is the attachment surface V2 side.

Also, the engaging part 65 has a narrow portion 66 that narrows in width proceeding toward the distal end side as seen from the lengthwise direction of the path restricting member 40. In the present embodiment, the engaging part 65 is the narrow portion 66 that narrows in width proceeding toward the as the distal end side. Further, the engaging part 65 is contactable with both circumferential end portions 44 of the main body part 41 of the path restricting member 40, and is contactable with the guiding ribs 48. That is, the engaging part 65 is simultaneously contactable with both circumferential end portions 44 of the main body part 41 and the guiding ribs 48. Note that the position of the path restricting member 40 with respect to the fixing member 60 is adjustable in the lengthwise direction of the path restricting member 40 while suppressing circumferential rotation of the path restricting member 40 with respect to the fixing member 60.

As shown in FIG. 4, the wire harness 10 includes a slide restricting member 70 that restricts movement of the path restricting member 40 with respect to the exterior member 30 in the lengthwise direction of the exterior member 30. The slide restricting member 70 of the present embodiment is an adhesive tape. The slide restricting member 70 restricts movement of the path restricting member 40 with respect to the exterior member 30, by being wrapped from the path restricting member 40 to the exterior member 30 at both lengthwise ends of the path restricting member 40.

The operation of the present embodiment will now be described.

According to the wire harness 10 of the present embodiment, the path restricting member 40 can be subsequently attached to the outer periphery of the exterior member 30 through the insertion opening 42. In other words, the path restricting member 40 can be assembled to the exterior member 30 from a direction orthogonal to the lengthwise direction of the exterior member 30. Since the path restricting member 40 has the pair of protruding parts that contact the outer surface of the exterior member 30, detachment of the path restricting member 40 from the exterior member 30 through the insertion opening 42 can be suppressed.

Further, since the path restricting member 40 has the ribs 43 that protrude from the outer periphery of the main body part 41 and extend along the lengthwise direction of the path restricting member 40, the flexural rigidity of the path restricting member 40 can be increased. Therefore, for example, bending of the path restricting member 40 is suppressed even when subjected to vibration or an external force of some sort, and deviation of the exterior member and, consequently, the wire member 20, from its path is suppressed.

Also, the wire harness 10 can be fixed by holding the path restricting member 40 attached to the exterior member 30 in the fixing member 60 with the support ribs 47, and fixing the fixing member 60 to the vehicle body V1. At this time, the engaging part 65 of the fixing member 60 is contactable with both circumferential end portions 44 of the main body part 41 of the path restricting member 40, and thus circumferential rotation of the path restricting member 40 with respect to the fixing member 60 is suppressed.

The effect of the present embodiment will now be described.

(1) The path restricting member 40 can be subsequently attached to the outer periphery of the exterior member 30 through the insertion opening 42. Further, since the path restricting member 40 has the ribs 43 that protrude from the outer periphery of the main body part 41 and extend along the lengthwise direction of the path restricting member 40, the flexural rigidity of the path restricting member 40 can be increased. Therefore, deviation of the wire member 20 from its path can be suppressed. Because the flexural rigidity of the path restricting member 40 can be increased, it is also possible to reduce the thickness of the main body part 41.

(2) Since the path restricting member 40 is more rigid than the exterior member 30, the path of the wire member 20 can be more firmly restricted by the rigid path restricting member 40.

(3) Since the ribs 43 include the support ribs 47 provided on both the first constituent part 45 and the second constituent part 46 of the main body part 41, the electrical wire 13 with path restricting member attached is easily supported by another member. That is, the support ribs 47 are provided on the first constituent part 45 constituting one side of the main body part 41 with respect to the circumferential center thereof and the second constituent part 46 constituting the other side of the main body part 41 with respect to the circumferential center thereof. Therefore, the electrical wire 13 with path restricting member attached is easily held by the fixing member 60 supporting the pair of support ribs 47 with the pair of support parts 61.

(4) Since the ribs 43 include the guiding ribs 48 that are provided on both circumferential end portions 44 of the main body part 41 and are spaced wider apart from each other proceeding in the direction in which the ribs 43 protrude, the exterior member 30 can be smoothly inserted inside the path restricting member 40.

(5) Since the fixing member 60 has the engaging part 65 and the engaging part 65 is contactable with both circumferential end portions 44 of the main body part 41, the fixing member 60 is able to suppress rotation of the path restricting member 40 with respect to the fixing member 60 while holding the path restricting member 40. Therefore, for example, rotation of the path restricting member 40 due to vibration or the like while the vehicle V is travelling is suppressed, and orientation of the insertion opening 42 downward such as opposing the ground is suppressed. As a result, for example, deterioration of the capability of the path restricting member 40 that protects the exterior member 30 from flying stones or the like is suppressed, and deterioration of the durability of the wire harness 10 can be suppressed. Also, since the fixing member 60 that is fixed to the vehicle body V1 has the engaging part 65 that suppresses rotation of the path restricting member 40, the number of components can be reduced as compared with the case where these functions are configured with different members.

(6) Since the engaging part 65 has the narrow portion 66 that narrows in width proceeding toward the distal end side as seen from the lengthwise direction of the path restricting member 40, the engaging part 65 is easily inserted into the insertion opening 42, and assembly is facilitated.

(7) Since the engaging part 65 is contactable with the guiding ribs 48, circumferential rotation of the path restricting member 40 with respect to the fixing member 60 can be further suppressed.

Example Changes

The present embodiment can be implemented in a changed manner as follows. The present embodiment and the following example changes can be implemented in combination with each other to the extent that there no technical inconsistencies.

In the above embodiment, the ribs 43 include the support ribs 47 provided on both the first constituent part 45 and the second constituent part 46 of the main body part 41, but the present disclosure is not limited thereto, and the path restricting member may be constituted to not have the support ribs 47. Also, the pair of support ribs 47 protrude in directly opposite directions to each other, but may protrude in directions shifted from being directly opposite. Note that, in this case, the shape of the fixing member 60 together with the path restricting member 40 needs to be changed.

In the above embodiment, the ribs 43 include the guiding ribs 48 that are provided on both circumferential end portions 44 of the main body part 41 and are spaced wider apart from each other proceeding in the direction in which the ribs 43 protrude, but the present disclosure is not limited thereto, and the path restricting member may be constituted to not have the guiding ribs 48, In the above embodiment, the ribs 43 include the general rib 49 provided at the circumferential center of the main body part 41, that is, at the boundary between the first constituent part 45 and the second constituent part 46, but the present disclosure is not limited thereto, and the path restricting member may be constituted to not have the general rib 49.

The path restricting member may be constituted to have ribs other than the ribs 43 of the above embodiment, specifically, ribs other than the support ribs 47, the guiding ribs 48, and the general rib 49. For example, in the path restricting member 40 of the above embodiment, ribs may be further provided between the support ribs 47 and the general rib 49.

In the above embodiment, the fixing member 60 has the engaging part 65, and the engaging part 65 is contactable with both circumferential end portions 44 of the main body part 41, but the present disclosure is not limited thereto, and the fixing member may be constituted to not have the engaging part 65. Note that, in this case, circumferential rotation of the path restricting member 40 with respect to the fixing member 60 is preferably suppressed with another configuration.

In the above embodiment, the engaging part 65 has the narrow portion 66 that narrows in width proceeding toward the distal end side as seen from the lengthwise direction of the path restricting member 40, but the present disclosure is not limited thereto, and the engaging part may be constituted to not have the narrow portion 66.

In the above embodiment, the engaging part 65 is contactable with the guiding ribs 48, but is not limited thereto, and may be configured to not contact the guiding ribs 48.

In the above embodiment, the path restricting member 40 is more rigid than the exterior member 30, but the present disclosure is not limited thereto, and the path restricting member 40 may be constituted to be of equivalent hardness to the exterior member 30 or softer than the exterior member 30. That is, as long as the path restricting member 40 acts such that the exterior member 30 does not bend easily and is able to restrict the path along which the wire member 20 is routed, the path restricting member 40 may be more rigid than the exterior member 30, may be softer than the exterior member 30, or may be of equivalent hardness to the exterior member 30.

In the above embodiment, the path restricting member 40 is made of resin, but is not limited thereto, and may be made of metal, for example. The path restricting member 40 may, for example, be made of an iron-based, copper-based or aluminum-based metal material. Also, the path restricting member 40 may be constituted by a metal plate material, and the ribs 43 may be formed by bending the plate material. When the path restricting member 40 is made of metal in this way, an increase in the temperature inside the exterior member 30, and, consequently, an increase in the temperature of the wire member 20, can be suppressed, in cases such as when disposed at a position close to a heat source of the vehicle V, for example. Also, the ribs 43 need not be solid and may be hollow, regardless of whether the path restricting member 40 is made of resin or metal.

In the above embodiment, two fixing members 60 are provided in the lengthwise direction of the path restricting member 40, but the present disclosure is not limited thereto, and one fixing member or three or more fixing members may be provided in the lengthwise direction of the path restricting member 40.

In the above embodiment, the path restricting member 40 has the protruding parts 50 that contact the outer surface of the exterior member 30, but is not limited thereto, and may be constituted to not have the protruding parts 50.

In the above embodiment, the fixing member 60 is fixed to the vehicle body V1 by the fitting part 63, but is not limited thereto, and may be fixed with another configuration.

The exterior member 30 may have a metal layer including a metal material that is provided on the outer surface of the corrugated tube. Such a metal layer can be provided by plating, for example. The metal layer is preferably provided on the entire outer surface of the annular raised parts 31 and the annular recessed parts 32 of the corrugated tube. A metal material such as aluminum whose emissivity is small, for example, is preferably used for the innermost surface of the metal layer. According to such a configuration, an increase in the temperature inside the exterior member 30, and, consequently, an increase in the temperature of the wire member 20, can be suppressed, in cases such as when disposed at a position close to a heat source of the vehicle, for example.

The exterior member 30 may have a slit that extends in the lengthwise direction of the exterior member 30. In this case, the exterior member 30 is preferably sealed around the entirety thereof in the circumferential direction, by taping the outer periphery of the exterior member 30, for example, so as to close the slit over the entirety thereof in the lengthwise direction of the exterior member 30. Deterioration in the water stopping performance of the exterior member 30 having the slit can thereby be suppressed.

The wire member 20 may have one wire 21 or may have three or more wires 21.

The braided member 24 can also be omitted from the wire member 20.

The wire harness 10 may include a plurality of path restricting members 40 that are provided at an interval from each other in the lengthwise direction of the exterior member 30.

The path restricting member 40 is not limited to a path restricting member provided under the floor of the vehicle V. As long as a portion of the routing path of the wire member extends linearly, the path restricting member 40 may, for example, be provided within the vehicle cabin of the vehicle V.

As shown in FIG. 2, the engaging part 65 of the fixing member 60 may have a shape that narrows in width proceeding toward the distal end of the engaging part 65, along both circumferential end portions 44 of the main body part 41 and the guiding ribs 48 of the path restricting member 40, The entirety of the engaging part 65 that contacts or opposes both circumferential end portions 44 of the main body part 41 and the guiding ribs 48 of the path restricting member 40 may be the narrow portion 66. The distal end of the engaging part 65, which can be a radially inward-facing surface of the engaging part 65, may have a shape that follows the outer periphery of the exterior member 30. In the case where the outer periphery of the exterior member 30 has a convex shape, when seen from the lengthwise direction of the path restricting member 40 as shown in FIG. 2, the distal end of the engaging part 65 may have a concave shape that corresponds to or matches the convex shape. The engaging part 65 may at least partially contact the exterior member 30.

As shown in FIG. 2, the pair of supporting parts 61 of the fixing member 60 may contact the distal end of the corresponding support ribs 47, so as to sandwich the electrical wire 13 with path restricting member attached.

As shown in FIG. 2, in some modes of the present disclosure, an electrical wire (13) with path restricting member attached can include a path restricting member (40) that is attached to the outer peripheral surface of the exterior member (30) by a snap-fit, for example, and is configured to restrict the lengthwise shape of the exterior member (30) and the wire member (20).

As shown in FIGS. 2 and 3, in some modes of the present disclosure, the radially inward-facing surface of the path restricting member (40) may have a non-protruding surface that can be a concave surface extending between both protruding parts (50).

As shown in FIG. 2, in some modes of the present disclosure, when the path restricting member (40) is attached to the exterior member (30), the path restricting member (40) may contact the radially outward-facing surface of the exterior member (30) at both protruding parts (50) of the path restricting member (40) and at part of the non-protruding surface of the path restricting member (40), a gap may be formed between other parts of the non-protruding surface of the path restricting member (40) excluding the part of the non-protruding surface that contacts the exterior member (30) and the radially outward-facing surface of the exterior member (30), and the gap may extend over the entire length of the path restricting member (40).

The invention claimed is:

1. An electrical wire structure comprising:
an electrical wire;
an exterior tube covering an outer periphery of the electrical wire; and
a path restrictor covering a range spanning more than half of an outer periphery of the exterior tube in a circumferential direction of the exterior tube, extending along a lengthwise direction of the exterior tube, and restricting a path along which the electrical wire is routed,
wherein the path restrictor has:
a main body covering a range spanning more than half of the outer periphery of the exterior tube in the circumferential direction of the exterior tube;
an insertion opening formed by both circumferential ends of the main body, extending along a lengthwise direction of the path restrictor over an entirety thereof in the lengthwise direction, and configured for the exterior tube to be insertable therein;
support ribs each protruding from an outer periphery of the main body except the circumferential ends thereof, and the support ribs extending along the lengthwise direction of the path restrictor; and
guiding ribs provided on the circumferential ends of the main body to contact an engaging part of a fixing member fixed to a vehicle body, so as to suppress circumferential rotation of the path restrictor.

2. The electrical wire structure according to claim 1, wherein the path restrictor is more rigid than the exterior tube.

3. The electrical wire structure according to claim 1, wherein:
the main body has:
a first constituent part forming one side of the main body with respect to a circumferential center of the main body; and
a second constituent part forming the other side of the main body with respect to the circumferential center of the main body; and
the support ribs are provided on both the first constituent part and the second constituent part.

4. The electrical wire structure according to claim 1, wherein the guiding ribs are spaced wider apart from each other proceeding in a direction in which the guiding ribs protrude.

5. A wire harness comprising:
an electrical wire with a path restrictor attached; and
a fixing member holding the electrical wire with the path restrictor attached,
wherein the electrical wire with the path restrictor attached has:
the electrical wire;
an exterior tube covering an outer periphery of the electrical wire; and
the path restrictor covering a range spanning more than half of an outer periphery of the exterior tube in a circumferential direction of the exterior tube, extending along a lengthwise direction of the exterior tube, and restricting a path along which the electrical wire is routed,
the path restrictor has:
a main body covering a range spanning more than half of the outer periphery of the exterior tube in the circumferential direction of the exterior tube;
an insertion opening formed by both circumferential ends of the main body, extending along a lengthwise direction of the path restrictor over an entirety thereof in the lengthwise direction, and configured for the exterior tube to be insertable therein;
support ribs each protruding from an outer periphery of the main body except the circumferential ends thereof, and the support ribs extending along the lengthwise direction of the path restrictor; and
guiding ribs provided on the circumferential ends of the main body to contact an engaging part of the fixing member fixed to a vehicle body, so as to suppress circumferential rotation of the path restrictor,
the main body has:
a first constituent part forming one side of the main body with respect to a circumferential center of the main body; and
a second constituent part forming the other side of the main body with respect to the circumferential center of the main body,
the support ribs are provided on both the first constituent part and the second constituent part, and
the fixing member has a pair of supporting parts supporting the support ribs.

6. The wire harness according to claim 5, wherein the path restrictor is more rigid than the exterior tube.

7. The wire harness according to claim 5, wherein:
the fixing member has the engaging part protruding toward the insertion opening, and
the engaging part is contactable with at least one of the circumferential ends of the main body.

8. The wire harness according to claim 7, wherein the engaging part has a narrow portion narrowing in width proceeding toward a distal end side as seen from the lengthwise direction of the path restrictor.

9. The wire harness according to claim 5, wherein the guiding ribs are spaced wider apart from each other proceeding in a direction in which the guiding ribs protrude.

10. The wire harness according to claim 7, wherein:
the guiding ribs are spaced wider apart from each other proceeding in a direction in which the guiding ribs protrude, and
the engaging part is contactable with of the guiding ribs.

11. An electrical wire structure configured to be held in a fixing member having a pair of supporting parts, comprising:
an electrical wire;
an exterior tube covering an outer periphery of the electrical wire; and a path restrictor covering a range spanning more than half of an outer periphery of the exterior tube in a circumferential direction of the exterior tube, extending along a lengthwise direction of the exterior tube, and restricting a path along which the electrical wire is routed, wherein the path restrictor has:

a main body covering a range spanning more than half of the outer periphery of the exterior tube in the circumferential direction of the exterior tube;

an insertion opening formed by both circumferential ends of the main body, extending along a lengthwise direction of the path restrictor over an entirety thereof in the lengthwise direction, and configured for the exterior tube to be insertable therein;

support ribs each protruding from an outer periphery of the main body except the circumferential ends thereof, and the support ribs extending along the lengthwise direction of the path restrictor; and guiding ribs provided on the circumferential ends of the main body to contact an engaging part of the fixing member fixed to a vehicle body, so as to suppress circumferential rotation of the path restrictor, the main body has:

a first constituent part forming one side of the main body with respect to a circumferential center of the main body; and a second constituent part forming the other side of the main body with respect to the circumferential center of the main body; and the support ribs are provided on both the first constituent part and the second constituent part, and are configured to be supported by the pair of supporting parts.

12. The electrical wire structure according to claim 11, wherein the path restrictor is more rigid than the exterior tube.

* * * * *